Oct. 18, 1966      A. A. EMMERLING      3,279,244
TORQUE TRANSDUCER

Filed May 8, 1964                                                2 Sheets-Sheet 1

INVENTOR.
ANSON A. EMMERLING
BY James R. Campbell
HIS ATTORNEY

INVENTOR.
ANSON A. EMMERLING
BY
HIS ATTORNEY

United States Patent Office 3,279,244
Patented Oct. 18, 1966

3,279,244
TORQUE TRANSDUCER
Anson A. Emmerling, Albany, N.Y., assignor to General
Electric Company, a corporation of New York
Filed May 8, 1964, Ser. No. 366,049
4 Claims. (Cl. 73—136)

The invention described herein relates to dynamometers of the type useful in determining the input or output torque of a rotating machine by measuring the reaction torque of the stationary member when the machine rotor is rotated under load.

My prior Patent 2,845,795 assigned to the same assignee as the present invention, teaches that the stationary parts consisting of a stator and frame in a motor or generator tends to turn about its axis when the windings are energized and the rotor or shaft is rotated. The force tending to produce such stationary part rotation is identified as a reaction torque directly related in magnitude to the torque input or output of the rotating part in the machine. This concept led to the development of a spring suspension system and associated recording devices which measure the reaction torque to obtain a true indication of the actual shaft input or output torque.

The structure used for this purpose consisted of a base mounted leaf spring suspension system designed to support the machine whose torque input or output was being measured. The supports or spring suspension system include a plurality of cantilever beams so designed and mounted to carry the weight of the rotating machine without substantial bending, but still sufficiently flexible to permit the normally stationary portion of the machine to rotate in an amount proportional to the reaction torque developed by the machine. To determine the degree of such movement, motion sensing elements were mounted between the movable machine supports and the base and connected to a recording instrument which furnished an indication of the measured torque.

The primary advantage offered by this construction is a simple spring suspension system which can be used for detecting and measuring torque accurately over a wide range of machine sizes rather than using different size absorption dynamometers as was customary in the past. Moreover, it became possible to obtain torque measurements independent of machine speed, thus permitting the gathering of accurate information which theretofore was not obtainable.

Although torque measuring devices of the type described above have operated successfully, continued developmental efforts have shown that the cantilever springs, when subjected to the adverse influences of vibration and flexing, fracture between the immovable base and the machine bed plate to which they were connected.

These cantilever springs supported the weight of the base and machine mounted thereon and the stresses due to weight greatly complicate the stress and strain pattern within the spring material itself and so greatly accelerate the fatigue of the spring metal. Another factor contributing to accelerated fatigue of the material is that under flexure the cantilever springs of necessity are deformed into a very shallow S and are stretched since there is an increase in distance from their mounting location on the base to the motor mount fastening when flexure occurs. If the springs form the S but do not stretch, a slight movement is necessary between the mounting surface and the fastening means which is reflected as a change in mechanical assembly and a shift in the zero of the motion indicating means.

In view of the disadvantages inherent in the above described torque transducer, it is apparent the need exists for an improved spring suspension system of greater strength and reliability and the primary object of my invention therefore is to provide a construction which satisfies this need.

In carrying out my invention, I utilize the same design of base mounting and machine bed plate as in my prior invention but substitute for the cantilever springs, a pair of cylindrically shaped springs disposed at right angles to one another for resisting the reaction torque in the machine being tested. This spring suspension system permits motor frame movement through a plane which extends through the axis of the springs and the machine shaft. One of the cylindrical springs coacts with supports positioned beneath the shaft centerline to nullify the freedom of frame movement in horizontal and vertical planes, while the other spring permits freedom of frame movement in a circumferential direction to measure the reaction torque in the machine. It will be apparent to those skilled in the art that other different arrangements may be used for resistricting movement in two planes while permitting the machine to rotate circumferentially about its axis to obtain an accurate indication of the input or output torque of the rotating shaft.

While the specification concludes with claims particularly pointing out and distinctly claiming the subject matter which I regard as my invention, it is believed the invention will be better understood from the following description taken in connection with the accompanying drawing in which:

Figure 1:
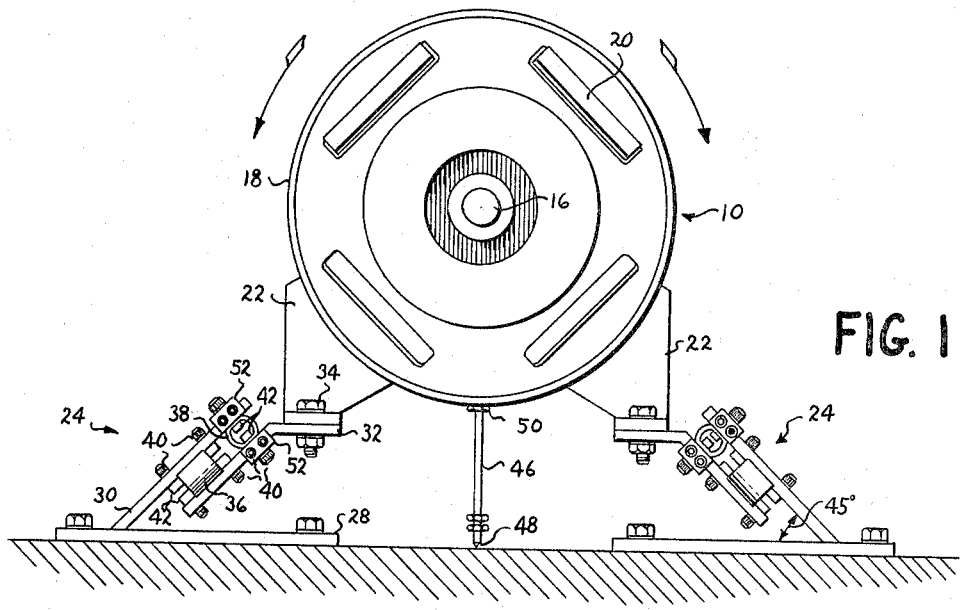
FIGURE 1 is an end view in elevation of a rotating machine incorporating the spring suspension system of this invention.
Figure 2:
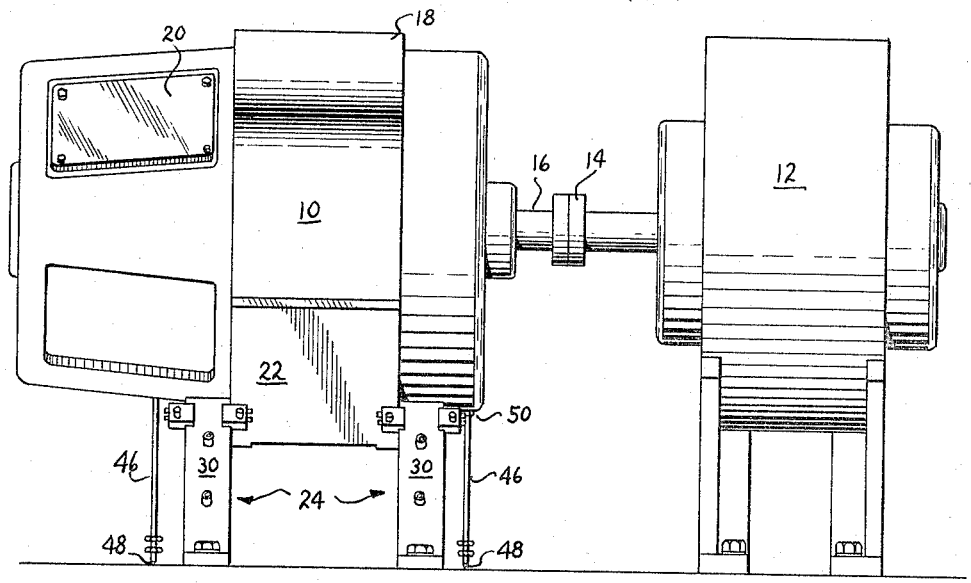
FIGURE 2 is a side view in elevation of the apparatus shown in FIGURE 1.

Referring now to the drawings wherein like reference characters designate like or corresponding parts throughout the several views, there is shown a rotating machine such as a motor or generator 10 directly connected to a second rotating machine of a similar type by a flexible or other coupling 14. For the purposes of simplicity, the rotating machine 10 will be referred to hereafter as a motor while the machine 12 will serve the function of a generator in loading the motor during the torque measuring operation. As shown in these figures, the motor 10 comprises the machine whose input or output torque is to be measured. It will be understood however, the invention is applicable to any kind of rotating machinery.

The motor 10 is of conventional design and includes a stator and rotor having a shaft 16 mounted in the frame 18. Ventilation openings 20 of the usual type are provided for cooling purposes and the machine is equipped with feet 22 to permit mounting in a stationary position.

The spring suspension system 24 supports the motor in spaced relationship with the foundation and is used for measuring the motor reaction torque which is a function of the shaft input or output torque. As more fully described hereafter, motor movement is prevented in both the horizontal and vertical planes but complete freedom for movement in a circumferential direction, either clockwise or counterclockwise is permitted. The spring suspension system consists of four angle-shaped immovable bases located under the motor feet, each including a base plate 28 having an upstanding arm 30 extending in a direction towards the motor and at an angle of approximately 45° with the motor shaft centerline. The motor is supported by each base through the intermediary means of a foot support 32 attached to the motor feet by bolts 34 or other securing means.

To accommodate the transmission of weight from the motor through the suspension system to the foundation, a pair of hollow cylindrical tubes or springs 36 and 38 are positioned at right angles to each other, are located between each foot support 32 and arm 30 and attached thereto by bolts 40 or other securing means. Since the torque readings may be affected if openings were formed in the cylinders for reception of the bolts, which also may distort the cylinders, a pair of support bars 42 are positioned in opposite sides of each cylinder and held in place by the bolts in a location axially outward from the cylinder ends. Because the cylinders are chosen to deflect to an elliptical configuration in response to the reaction forces, the radius of curvature of the bar surfaces engaging the inner surfaces of the cylinders are less than the cylinder curvature, thereby permitting such distortion without adversely affecting the torque readings.

The 45° angle between the base plate 28 and the axis of spring 36 is formed by the base line and a radial line extending from the centerline of the motor shaft through the spring center. A.-C. motors rated at 1800 r.p.m. in National Electrical Manufacturers Association sizes from 1 H.P. to 100 H.P. have an included angle of from 50 to 52 degrees between the base line and a line from the shaft centerline to the foot bolt hole. The 45° angle permits adjustment of the transducer when it is installed so that the spring centerline coincides with the radial line from the machine shaft centerline.

The cylinders 36 must be prevented from displacement along their axis and this is accomplished by providing circular, shallow-milled shoulders 44 in the facing surfaces of both the support arm 30 and foot supports 32. The hollow springs therefore are restricted against movement and effectively resist the forces of reaction which tend to move the cylinders in the axial direction. Since the spring 36 axis is on the radial line extending to the shaft, the motor weight is transmitted through the springs directly to the base plate and foundation without adversely affecting the torque readings. Moreover, the spring clamping arrangement used precludes movement of the motor in the horizontal direction while still permitting rotational freedom of movement.

Oscillatory movement of the motor in a vertical plane is prevented by at least two longitudinally adjustable support members 46 having a point 48 on one end and a concave surface 50 on its other end, the arrangement being such that the members are positioned directly beneath the shaft and thereby preclude movement of the motor in a vertical direction.

Figure 3:
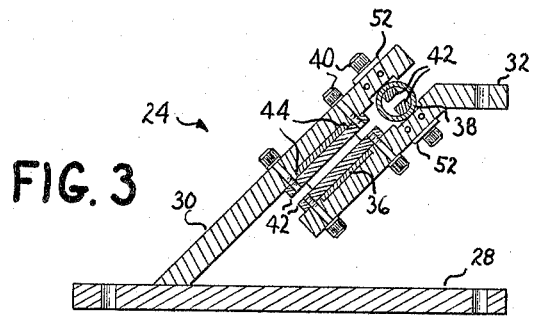
FIGURE 3 is a detailed view of the spring suspension elements used in holding the rotating machine in spaced relation with the base.
Figure 4:
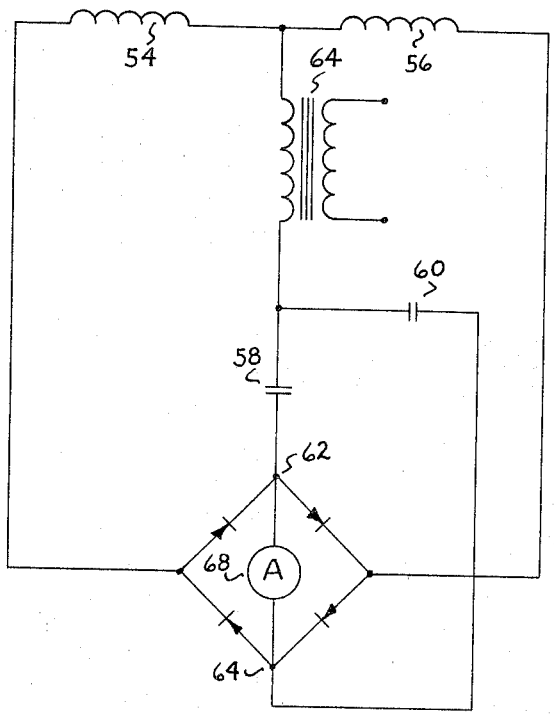
FIGURE 4 illustrates a circuit arrangement for the testing apparatus.
Figure 5:
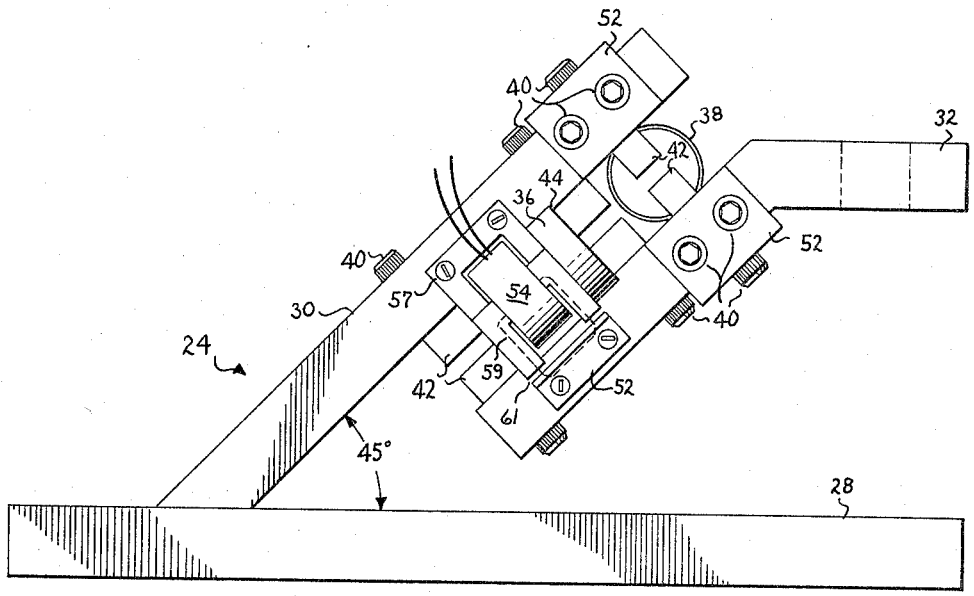

Various means may be employed to measure the motion or displacement of those portions of the equipment that respond to the reaction torque. A convenient and accurate way of making such measurements is disclosed in my prior patent and as illustrated in FIGURES 3 and 4, consists of a variable inductance strain gauge. The strain gauge is of conventional, commercially available type and comprises an armature 52 immovably attached to one of the foot supports 32, and two coils 54 and 56, secured to the adjacent arm 30. Only coil 54 is shown in FIGURE 3. Each coil is secured to arm 30 by brackets 57. The flux path 59 for coil 54 and the armature is indicated by dotted lines. The operation of such a strain gauge is based on the principle that the inductance of the coils is changed in response to movement of armature 52, which varies the air gaps 61 between the ends of the armature and the coils. For example, if the reaction torque is such as to cause the motor foot support 32 to move upwardly, as seen in FIGURES 1 and 3, the armature 52 will move closer to one coil and farther away from the other coil, thus decreasing the air gap 61 and increasing the other air gap. This change in air gap width causes the inductances of the two coils to change in opposite directions by an amount proportional to the change in air gap width.

FIGURE 4 illustrates a typical circuit into which the strain gauge coils may be connected to give an indication of the torque input or output of the machine under test. The circuit is of conventional well known type, in which the strain gauge coils 54 and 56 comprise two arms of an A.C. bridge. The other two arms comprise capacitors 58 and 60 of equal value, connected to the remainder of the bridge through a rectifier circuit 62. The bridge may be energized from the secondary winding of a transformer 64 connected between opposite corners of the bridge between the inductances 54 and 56 and the capacitors 58 and 60, and the transformer primary winding may be connected to a conventional source of alternating current (not shown). When the circuit is energized, current flows through the coil inductances 54 and 56 and through the capacitors 58 and 60. If the inductances of the coils 54 and 56 are equal, the voltage drops across the inductances 54 and 56 are equal, the voltage drops across the capacitors 58 and 60 are equal, and the opposite points 64 and 66 of the rectifier bridge 62 are at equal D.C. potentials. Therefore, no current will flow through a D.C. ammeter 68 connected between the points 62 and 64. However, if the armature of the strain gauge is moved so that the inductance of one of the gauge coils is increased, and the inductance of the other is decreased, then the voltage drops across the inductances 54 and 56 will be unequal, and current will flow through the ammeter 68. Obviously, the motor movement in either direction with a subsequent change in the distance between the coils and the armature will produce current flow through the ammeter 68 in the opposite direction thus giving an indication of the reaction torque in the machine. Thus, the reading of the ammeter 68 is indicative of the torque input or output of the rotating machine under test, and suitable calibration curves may be made to convert the ammeter reading into terms of torque input or output. Of course, a D.C. voltmeter may be used to measure the potential difference between the points 62 and 64 instead of an ammeter, or a recording device may be used to provide a permanent record of the torque measurements. It has been found particularly desirable to use a recording device such as an XY recorder in conjunction with the invention in order to provide a record of transient torques, which have not been observable in the dynamometers previously known.

*Operation*

In operation, the motor is coupled to a generator or other power absorbing device which serves to load the motor. When the windings are energized, the rotor shaft turns in the usual manner and the motor stator and frame will tend to turn in a direction opposite from rotor rotation. Assuming the rotor turning in a clockwise direction as viewed in FIGURE 1, the frame will tend to rotate in the opposite direction because of the reaction torque developed in the machine. To determine the magnitude of the reaction torque and therefore permit conversion to a value indicating the output of the rotating member, movement of the frame in the counterclockwise direction causes both springs 36 and 38 on one side of the motor to stretch and thereby assume an elliptical configuration. The springs in the suspension system on the other side of the motor are compressed but likewise assume an elliptical configuration, but in a plane 90° from that assumed by the first set of springs. The degree of deformation of the springs will obviously vary depending on the magnitude of the reaction torque, but a true indication of the reaction torque is obtained by the strain gauge arrangement.

Since the armature of the strain gauge on the side of the motor where the springs are stretched will be moved away from the coils, the inductance of one of the coils is increased while the inductance of the other coil is decreased, thus producing an unequal voltage drop across the two inductances and across the capacitors to thereby cause current flow through the ammeter disposed in the bridge circuit. The magnitude of current from them can be converted to a value in terms of foot pounds which will indicate the magnitude of the torque output of the rotating member in the motor. Many different ways may be used for obtaining such values, either by having an ammeter record foot pounds and having conversion tables which will perform essentially the same function.

When the load is removed from the motor, the reaction torque will return to a zero value, thus relaxing the springs and moving the coils back into their initial position relative to the armature. At this time, the inductance of the coils will be the same and no current will flow through the ammeter, thereby indicating that forces which produce the reaction torque are not at that time operable in the machine.

It will be apparent that use of the strain gauge mounted on the opposite side of the machine will make possible measurement of the reaction torque of a generator assuming rotor rotation to be in the direction opposite from that of the motor. The coil will move in the same general manner and the readings likewise will correspond to the reaction torque developed by the rotating armature in the generator. As indicated previously the magnitude of the reaction torque may be observed on an XY recorder rather than using an ammeter in the manner described above.

The particular advantages gained from utilizing this kind of construction is the motor or generator undergoing tests is prevented from moving in vertical and horizontal planes while complete freedom for rotation in a circumferential direction is permitted. Since the weight of the machine is transmitted axially through the springs 32 to the foundation, the values of reaction torque obtained are not affected by such weight and they represent a true indication of the input or output torque, as the case may be, in the machine. Moreover, a multitude of sizes of machines may be tested by using the same springs and base mountings and machine supports without having to change the springs each time a different size machine is tested. It will be apparent that the larger and therefore heavier machines will require a more substantial supporting arrangement including the springs for accurately measuring the reaction torque developed therein during operation. Since the spring suspension system is not affected by speeds, a complete range of machines having speeds ranging up to more than 100,000 r.p.m. may easily and conveniently be tested without the necessity of utilizing special designs of dynamometers for this purpose. A particularly important advantage is the machines may be tested conveniently in the field prior to installation in a system, the only parts being needed for this purpose are the spring supporting system components which may readily be transported to and from the test site.

Although the present disclosure has been directed primarily towards the testing of rotating equipment having a rotor mounted in a horizontal plane, it will be apparent the teachings of this invention are equally applicable to the testing of such equipment mounted vertically. It obviously will be necessary to restrict movement in a fore and aft direction and in a direction perpendicular to this while still permitting freedom for movement in a circumferential direction. Although additional support may be needed at the bottom of the machine adjacent the foundation, this simply may be provided by mounting the machine end in a low resistance bearing or other device.

In view of the above, it will be apparent that many modifications and variations are possible in light of the above teachings. It therefore is to be understood that within the scope of the appended claims, the invention may be practiced other than as specifically described.

What I claim as new and desire to secure by Letters Patent of the United States is:

1. A torque transducer for measuring the input or output torque of a rotating machine comprising,
   a spring suspension system located between the frame of said machine and a foundation for allowing rotational movement of said frame,
   said spring system comprising a pair of coacting but spaced members associated with each foot on the machine frame,
   said spaced members being in substantial radial alignment with the machine shaft and respectively attached to the machine frame and the foundation,
   at least one spring of cylindrical configuration immovably positioned between said members for transmitting the weight of said machine axially therethrough to the foundation, but capable of deforming under the reaction forces generated by said machine during operation,
   and means associated with at least one of said pair of members for detecting and measuring the reaction torque of said machine during operation.

2. A torque transducer for measuring the input or output torque of a rotating machine comprising,
   a spring suspension system located between the frame of said machine and a foundation for allowing frame movement in a circumferential direction,
   said spring system comprising a base member associated with each foot of said machine and having an arm in substantial radial alignment with the shaft of said machine, a frame support mounted on each foot of the machine but located in spaced relationship with said member,
   at least one spring of cylindrical configuration immovably positioned between said members,
   means associated with said suspension system and said machine for precluding machine movement in vertical and horizontal planes but permitting movement in a circumferential direction,
   and means connected with said suspension system for detecting and measuring the reaction torque of said machine when it rotates in response to the electrical forces established in said machine.

3. A torque transducer for measuring the input or output torque of a rotating machine comprising:
   a spring suspension system located between the frame of said machine and a foundation for permitting movement of said frame in a circumferential direction,
   said suspension system comprising a base member and a foot support for each foot on the machine frame,
   means securing each of said members and foot supports respectively to the foundation and said frame,
   a pair of cylindrically shaped springs disposed at an angle to each other immovably mounted between each of said foot supports and members,
   the first of said springs being positioned to transmit the weight of said machine axially therethrough to the foundation without distortion, but capable of distorting when forces are applied to it other than those passing through its axis when subjected to the reaction torque of said frame,
   the other of said springs being positioned and mounted to restrict movement of said frame in a horizontal direction,
   means located between said frame and the foundation for precluding frame movement in a vertical direction, and
   means associated with said suspension system for detecting and measuring the magnitude of frame rotation when subjected to the reaction forces of said machine.

4. A torque transducer for measuring the input or output torque of a rotating machine comprising:
   a spring suspension system located between the frame of said machine and a foundation for permitting movement of said frame in a circumferential direction,
   said suspension system comprising a base member and a foot support for each foot on the machine frame,
   mean securing each of said members and foot supports respectively to the foundation and said frame, a pair of cylindrically shaped springs disposed at an angle to each other immovably mounted between each of said foot supports and members, a pair of shoulders formed in the facing surfaces of each of said foot supports and members and of a length sufficient to permit a snug fit with the first of said springs when the latter is positioned therein, each of said first springs having its axis such that it forms a 45° angle between the horizontal foundation and a plane passing through the machine shaft centerline for transmitting the weight of said machine to the foundation without deforming, each of the second springs having its axis located at a right angle to the first springs for preventing frame movement in a horizontal direction, means securing said springs in the space provided by said foot supports and members, means located between said frame and the foundation for precluding frame movement in a vertical direction, and means associated with said suspension system for detecting and measuring the magnitude of frame rotation when subjected to the reaction forces of said machine.

References Cited by the Examiner

UNITED STATES PATENTS

| | | | |
|---|---|---|---|
| 2,389,361 | 11/1945 | Hagg et al. | 73—134 |
| 2,845,795 | 8/1958 | Emmerling | 73—136 |
| 3,213,679 | 10/1965 | Lebow | 73—136 |

FOREIGN PATENTS

| | | |
|---|---|---|
| 1,118,645 | 3/1956 | France. |
| 40,749 | 5/1937 | Netherlands. |

RICHARD C. QUEISSER, *Primary Examiner.*

C. A. RUEHL, *Assistant Examiner.*